United States Patent
Ramachandra

(10) Patent No.: US 11,876,735 B1
(45) Date of Patent: Jan. 16, 2024

(54) SYSTEM AND METHOD TO PERFORM LOSSLESS DATA PACKET TRANSMISSIONS

(71) Applicant: Cisco Technology, Inc., San Jose, CA (US)

(72) Inventor: Harish Ramachandra, San Ramon, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 18/304,894

(22) Filed: Apr. 21, 2023

(51) Int. Cl.
*H04L 49/901* (2022.01)
*H04L 49/90* (2022.01)

(52) U.S. Cl.
CPC ........ *H04L 49/901* (2013.01); *H04L 49/9084* (2013.01)

(58) Field of Classification Search
None
See application file for complete search history.

(56) References Cited

U.S. PATENT DOCUMENTS

| 6,016,510 A | 1/2000 | Quattromani et al. |
| 10,826,649 B1 * | 11/2020 | Yu ......................... H04L 1/0058 |
| 2004/0174813 A1 | 9/2004 | Kasper et al. |
| 2006/0007862 A1 | 1/2006 | Sayeedi et al. |
| 2008/0301336 A1 | 12/2008 | Bilak et al. |
| 2020/0259880 A1 * | 8/2020 | Xiong .................... H04N 7/185 |
| 2021/0075744 A1 * | 3/2021 | Li ....................... H04L 49/9084 |
| 2021/0168095 A1 * | 6/2021 | Li .......................... H04L 49/90 |

FOREIGN PATENT DOCUMENTS

EP          1564935 A2     8/2005

* cited by examiner

*Primary Examiner* — Jeffrey R Swearingen
(74) *Attorney, Agent, or Firm* — Baker Botts L.L.P.

(57) ABSTRACT

A system may include a primary memory, a secondary memory, and a processor that may be communicatively coupled to one another. The processor may be configured to control data packet transmissions received via an input to the primary memory and the secondary memory. Further, the processor may be configured to monitor a current buffering level of the primary memory; and compare the first current buffering level to a first buffering threshold. The first buffering threshold may be indicative of a buffering capacity difference between a first buffering capacity of the primary memory and a second buffering capacity of the secondary memory. In response to determining that the current buffering level is equal to or greater than the first buffering threshold, pause the data packet transmissions via the input to the to the primary memory and the secondary memory.

20 Claims, 4 Drawing Sheets ns and methods to perform lossless data packet transmissions using multiple memory types.

SYSTEM AND METHOD TO PERFORM LOSSLESS DATA PACKET TRANSMISSIONS

TECHNICAL FIELD

The present disclosure relates generally to a field of data packet transmissions and, more particularly, to a device and a method to perform lossless data packet transmissions using multiple memory types.

BACKGROUND

Modern high performance-high throughput processing units typically have multiple memories. These processing units tend to lose data packets during transmissions in which the different memories are used simultaneously. The data packets are lost in transmissions when one memory is used to supplement operations performed by another memory. Specifically, data packets are lost in communication data paths when buffering queues in the memories are congested at a same time. Currently, data packet losses are expected in high performance-high throughput processing units. As a result, there are no solutions to reduce the losses in data packet transmissions associated with these processing units.

For example, in real-time media applications (e.g., video calls), a buffering system acting as a communication system may lose its ability to manage and correct for data packet losses that occur in a transmission path. In these cases, the loss of data packets affects users' ability to understand and enjoy a real-time media stream. In this regard, existing technologies attempt to perform a retransmission of the lost packets. This approach requires the processing units to use a lot of additional memory and processing capabilities to attempt to correct data packet losses. However, these approaches generally lead to uncoordinated, slow-responding, or redundant error techniques.

BRIEF DESCRIPTION OF THE DRAWINGS

For a more complete understanding of the present disclosure and for further features and advantages thereof, reference is now made to the following description taken in conjunction with the accompanying drawings, in which.

DESCRIPTION OF EXAMPLE EMBODIMENTS

Overview

Figure 1:
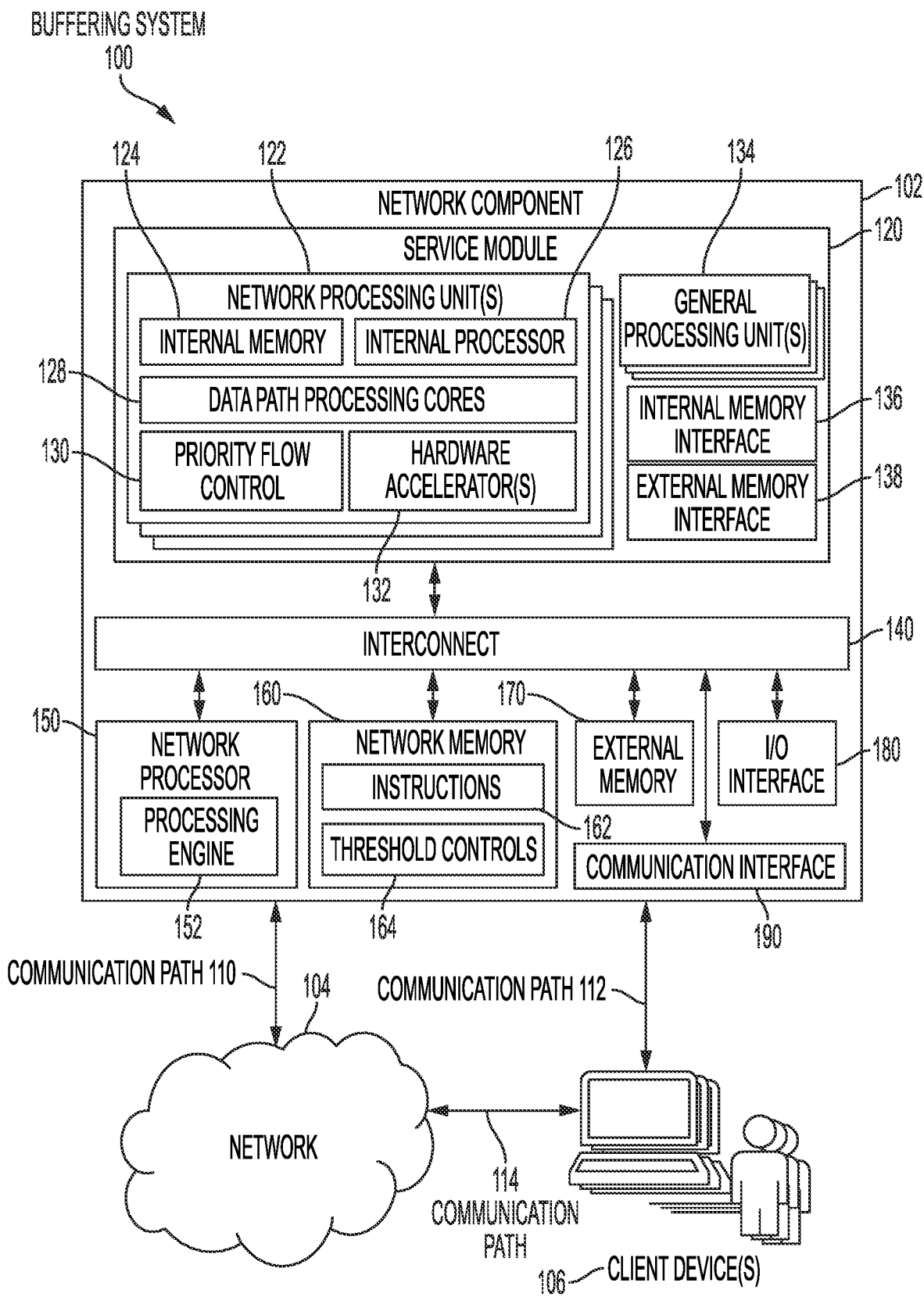
FIG. 1 illustrates an example buffering system, according to some embodiments of the present disclosure.

In one or more embodiments, a system and a method described herein are configured to perform lossless data packet transmissions using multiple memory types in modern high performance-high throughput processing units. The system and the method prevent data packet losses in transmissions when one memory is used to supplement operations performed by another memory. In some embodiments, the system and the method are configured to maintain a lossless behavior during data packet transmissions between multiple memory types with distinct corresponding memory speeds. Further, the system and the method described herein eliminate data packet losses in communication data paths by avoiding overflows in buffering queues of the multiple memories.

In some embodiments, the system includes a processor and two memories of different types operating at a same time. In one non-limiting example, a first memory may be a primary memory communicatively coupled to the processor via an internal interface connection. In this example, the first memory and the processor may be integrated in a same electric component (e.g., a network processing unit (NPU)) such that the first memory operates as an internal memory. In the same example, a second memory may be a secondary memory communicatively coupled to the processor via an external interface connection such that the secondary memory operates as an external memory. The first memory may include a first buffering capacity and a first memory speed. Further, the second memory may include a second buffering capacity and a second memory speed. In cases where the second buffering capacity may be lower than the first buffering capacity or the second memory speed may be lower than the first memory speed, the system may be configured to compensate by the differences in buffering capacity or memory speeds to prevent data packet losses.

In accordance with one or more embodiments, a system or an apparatus, such as a network component, includes a first memory, a second memory, and a processor communicatively coupled to one another. The first memory may be a primary memory that includes a first buffering capacity and a first memory speed. The second memory may be a secondary memory that includes a second buffering capacity and a second memory speed. The secondary memory speed may be slower than the first memory speed. The processor may be configured to control data packet transmissions received via an input to the primary memory and the secondary memory and monitor a current buffering level of the primary memory. Further, the processor is configured to compare the current buffering level to a first buffering threshold. The first buffering threshold is representative of a buffering capacity difference between the first buffering capacity and the second buffering capacity. In response to determining that the current buffering level is greater than or equal to the first buffering threshold, the processor is configured to pause the data packet transmissions via the input to the primary memory and the secondary memory.

In some cases, the processor is further configured to compare a current buffering level to a second buffering threshold. The second buffering threshold is representative of a memory speed difference between the first memory speed and the second memory speed. In response to determining that the second buffering threshold is less than the current buffering level, the processor is configured to restart the data packet transmissions via the input to the primary memory and the secondary memory.

In certain cases, the first buffering threshold is a preconfigured watermark value associated with a buffering limit in the primary memory. In other cases, the second buffering threshold is a preconfigured counter value associated with a buffering limit in the primary memory and in proportion to the secondary memory.

In some cases, the primary memory is an internal memory including an internal interface connection to the apparatus and the secondary memory is an external memory including an external interface connection to the apparatus.

In yet other cases, the processor is further configured to, in conjunction with performing the data packet transmissions via the input to the primary memory and the secondary memory, determine an amount of time to perform lossless data packet transmissions between the primary memory and the secondary memory based at least in part upon a first drain rate of the primary memory or a second drain rate of the secondary memory. Further, the processor is configured to pause the data packet transmissions from the source to the primary memory and the secondary memory within the amount of time. In some embodiments, the amount of time is a dynamically updated amount of time or a preconfigured amount of time.

In accordance with other embodiments, a method includes controlling data packet transmissions received via an input to a primary memory and a secondary memory. The primary memory and the secondary memory are communicatively coupled to one another. The primary memory comprises a first buffering capacity and a first memory speed. The secondary memory comprises a second buffering capacity and a second memory speed. The second memory speed is slower than the first memory speed. The method includes monitoring a current buffering level of the primary memory and comparing the current buffering level to a first buffering threshold. The first buffering threshold is indicative of a buffering capacity difference between the first buffering capacity and the second buffering capacity. In response to determining that the current buffering level is equal to or greater than the first buffering threshold, the method includes pausing the data packet transmissions via the input to the primary memory and the secondary memory.

In accordance with yet other embodiments, a non-transitory computer readable medium stores instructions that when executed by a processor cause the processor to control data packet transmissions received via an input to a primary memory and a secondary memory. The primary memory and the secondary memory are communicatively coupled to one another. The primary memory comprises a first buffering capacity and a first memory speed. The secondary memory comprises a second buffering capacity and a second memory speed. The second memory speed is slower than the first memory speed. The instructions cause the processor to monitor a current buffering level of the primary memory and compare the current buffering level to a first buffering threshold. The first buffering threshold is indicative of a buffering capacity difference between the first buffering capacity and the second buffering capacity. In response to determining that the current buffering level is less than the first buffering threshold, the instructions cause the processor to pause the data packet transmissions via the input to the primary memory and the secondary memory.

Technical advantages of certain embodiments of this disclosure may include one or more of the following. The system and the method described herein are configured to perform lossless data packet transmissions using multiple memory types including corresponding distinct memory speeds. Specifically, the system and the method reduce and prevent data packet losses by incorporating buffering capabilities of the memory types in use in a process of queuing data packets for transmission. In this regard, the system and the method reduce or eliminate data packet losses by preemptively pausing data packet transmissions from a source to a primary memory and a secondary memory when the primary memory or the secondary memory are within a percentage from filling up. As a result, data packet retransmissions are reduced for error correction response.

The system and method described herein are integrated into a practical application of regulating the buffering of data packets in multiple memories of different types. In this regard, the system and method are integrated into a practical application of providing lossless data packet transmissions by automatically establishing pausing triggers and restarting triggers to control the data flow in systems using more than one memory type. In particular, the system and the method provide a reliable and lossless data packet transmission approach to systems including an internal memory and an external memory. In these systems, buffering capacity and memory speed may be different for these different memory types. In this example, the system and the method may include pausing triggers that pause the data packet transmissions and restarting triggers that restart the data packet transmissions in accordance with the buffering capacities and the memory speeds of the internal memory and the external memory.

In addition, the system and method described herein are integrated into a practical application of reducing processing speed and memory usage in a system. Specifically, by reducing data packet losses, the system and the method reduce or eliminate the need for data packet retransmission procedures caused by dropped packets. Further, the system and the method are integrated into a practical application of reducing an overall amount of network traffic due to pausing data packet transmissions in cases when the multiple memory types are identified to be approaching a buffering threshold. This reduces the traffic on the network and helps alleviate network bottlenecks that could otherwise occur during operations requiring multiple data packet transmissions such as those involving Artificial Intelligence (AI) and Machine Learning (ML) procedures.

These practical applications may lead to a technical advantage of improving response speed and accuracy to user devices. For example, a technical advantage of one embodiment may allow for improved reliability in real-time communications between a client device and a media server. In another example, another technical advantage of one embodiment may allow to detect an external memory bandwidth congestion and generate a pause command on source-ports to prevent data packets losses due to: 1) exceeding a maximum queue size in an internal memory and 2) exceeding a total internal memory reserved for packet buffering during data packet transmissions. Other technical advantages will be readily apparent to one skilled in the art from the following figures, descriptions, and claims. Moreover, while specific advantages have been enumerated above, various embodiments may include all, some, or none of the enumerated advantages.

Example Embodiments

Figure 2:
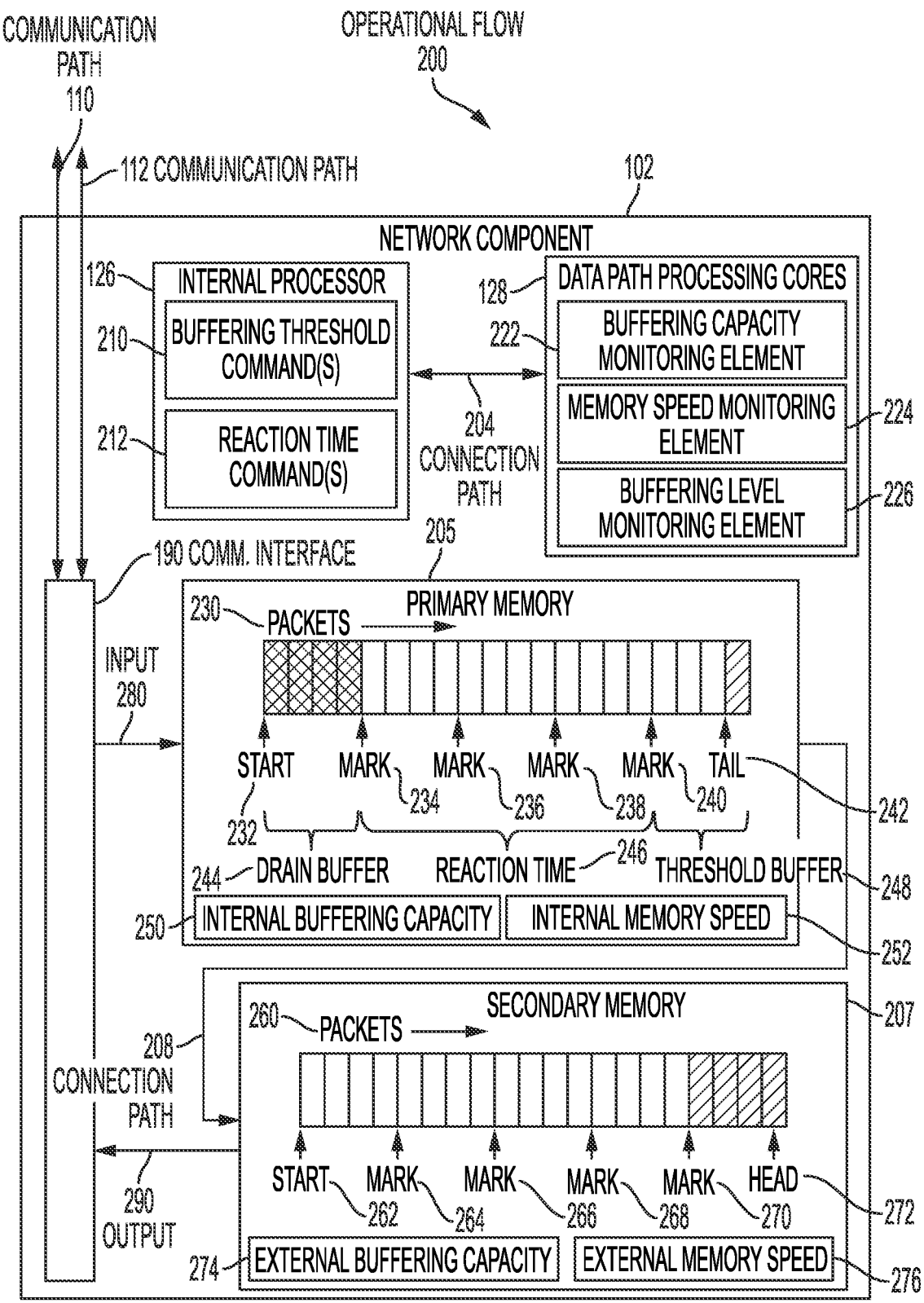
FIG. 2 illustrates an example operational flow of the buffering system of FIG. 1, according to some embodiments of the present disclosure.
Figure 3:
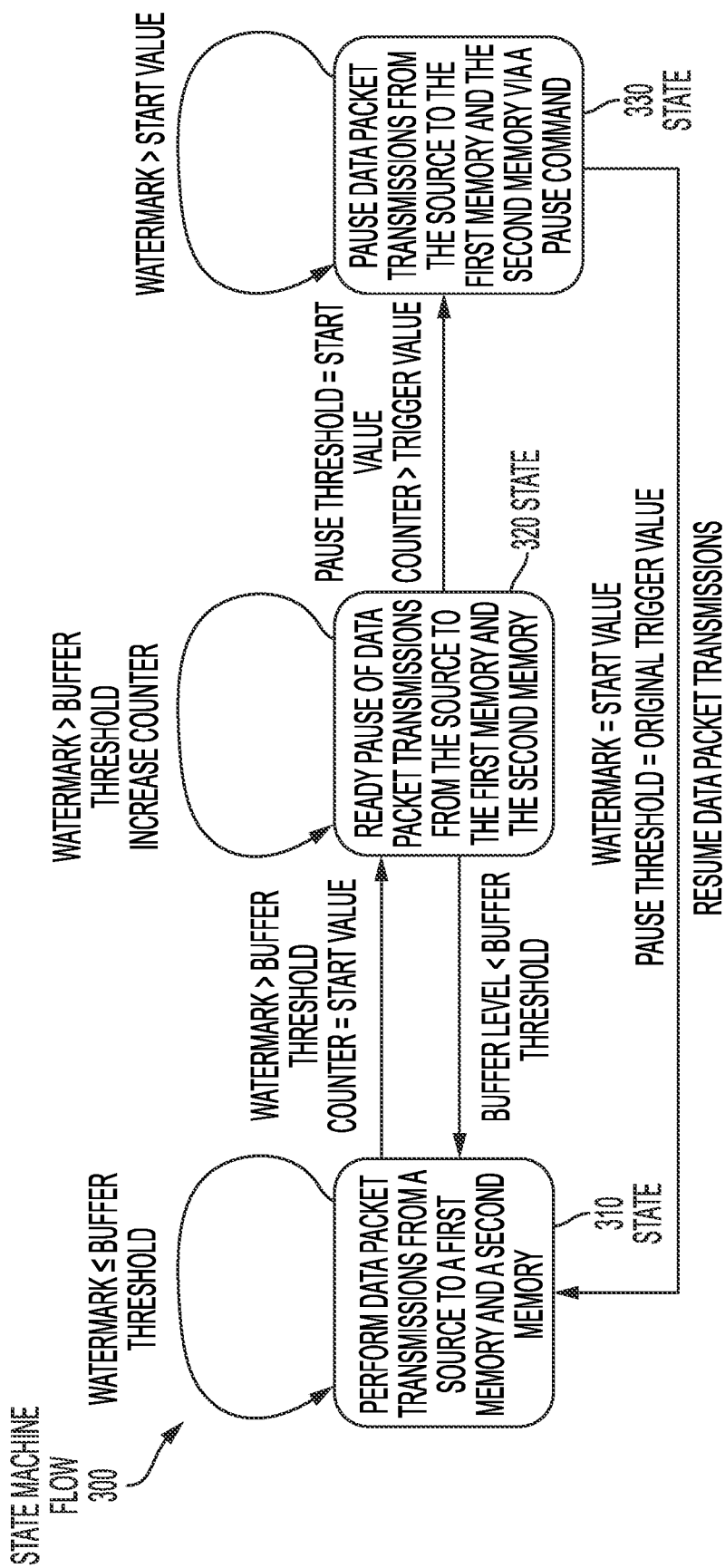
FIG. 3 illustrates an example state machine flow for the buffering system of FIG. 1, according to some embodiments of the present disclosure.
Figure 4:
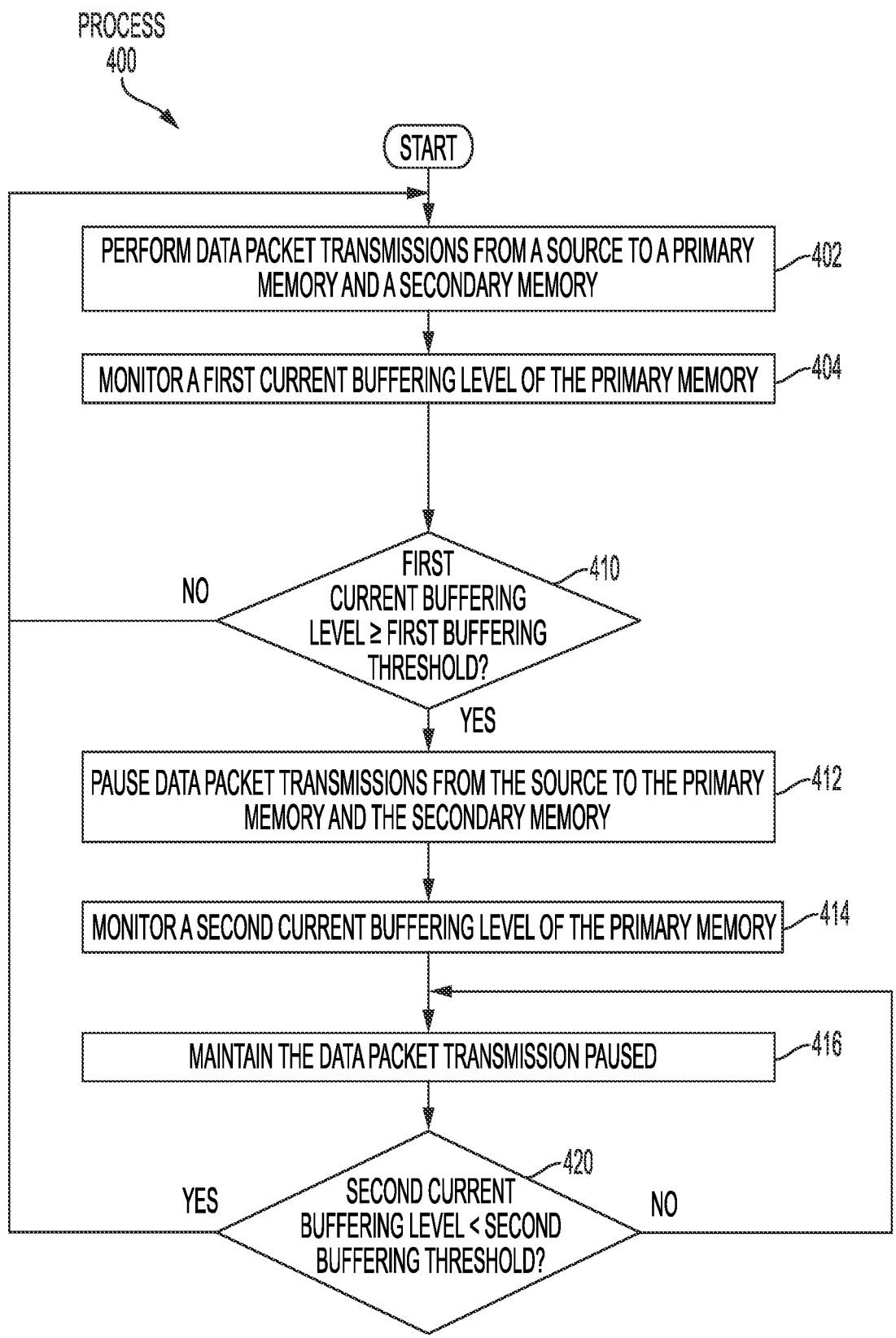
FIG. 4 illustrates an example process for performing the operational flow of FIG. 2, according to some embodiments of the present disclosure.

This disclosure describes systems and methods to perform lossless data packet transmissions using multiple memory types. In particular, this disclosure provides various systems and methods to prevent data packet losses in transmissions including memories with different buffering capacities or memory speeds. FIG. 1 illustrates a buffering system 100 in which one or more network processing units (NPUs) 122 use an internal memory 124 and an external memory 170 to perform data packet transmissions from a network component 102. FIG. 2 illustrates an operational flow 200 in which the buffering system 100 of FIG. 1 is configured to control buffering on a primary memory 205 (e.g., the internal memory 124) and a secondary memory 207 (e.g., the external memory 170). FIG. 3 illustrates state machine flow 300 in which the buffering system 100 of FIG. 1 is configured to perform lossless data packet transmissions by monitoring and controlling current buffering levels in the internal memory 124 and the external memory 170. FIG. 4 illustrates a process 400 to perform the operational flow 200 of FIG. 2.

FIG. 1 illustrates a buffering system 100 configured to perform one or more network operations in accordance with one or more embodiments. The network operations may include routing of control commands and data signals among at least one network component 102, one or more client devices 106, and a network 104. In the buffering system 100 of FIG. 1, the network component 102, the one or more client devices 106, and the network 104 are communicatively coupled to one another via multiple communication paths 110-114. For example, FIG. 1 shows that: the network component 102 and the network 104 are connected to one another via the communication path 110; the network component 102 and the one or more client devices 106 are connected to one another via the communication path 112; and the network 104 and the one or more client devices 106 are connected to one another via the communication path 112. The communication paths 110-114 may be wired or wireless connections among the at least one network component 102, the one or more client devices 106, or the network 104. In one or more embodiments, the network component 102 may be a hardware chassis configured to control data flow. The network component 102 may be configured to regulate data packet transmissions in the communication path 110 or the communication path 112. The communication paths 110-114 may include multiple bandwidth levels in which control signals and data signals may be transmitted using one or more communication protocols.

In one or more embodiments, the network 104 and the one or more client devices 106 may be a source or a destination for data packet transmissions monitored and controlled by the service module 120. In this regard, the communication interface 190 receives or transmits data packet transmissions exchanged with the network 104 via the communication path 110 and exchanged with the one or more client devices 106 via the communication path 112. The network component 102 may include a service module 120, a network processor 150, a network memory 160, an external memory 170, an input (I)/output (O) interface 180, and a communication interface 190 connected to one another via an interconnect 140. The network component 102 may be a computer system used to provide routing and assignment of resources during data packet transmissions. In one or more embodiments, one or more memory elements (e.g., the internal memory 124, a network memory 160, and the external memory 170) may be shared by various one or more processors (e.g., general processing units (GPUs) 134 and a network processor 150) in the network component 102. The one or more processors (e.g., the GPUs 134 and the network processor 150) in the network component 102 may be adapted to perform basic and advanced packet counting and forwarding operations. Although this disclosure describes and illustrates a particular network component 102 having a particular number of particular components in a particular arrangement, this disclosure contemplates any suitable network component 102 or computer system having any suitable number of any suitable components in any suitable arrangement.

In some embodiments, the network component 102 may take any suitable physical form. As example and not by way of limitation, the network component 102 may be an embedded computer system, a system-on-chip (SOC), a single-board computer (SBC) system (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, a router device, or a combination of two or more of these. Where appropriate, the network component 102 may include one or more computer systems; be unitary or distributed; span multiple locations; span multiple machines; span multiple data centers; or reside in a cloud, which may include one or more cloud components in one or more networks. Where appropriate, one or more computer systems may perform without substantial spatial or temporal limitation one or more steps of one or more methods described or illustrated herein. As an example, and not by way of limitation, the network component 102 may perform in real-time or in batch mode one or more steps of one or more methods described or illustrated herein. The network component 102 may perform at different times or at different locations one or more steps of one or more methods described or illustrated herein, where appropriate.

In some embodiments, the network processor 150 includes hardware for executing instructions, such as those making up a computer program. As an example, and not by way of limitation, to execute instructions, the network processor 150 may retrieve (or fetch) the instructions from an internal register, an internal cache, or the network memory 160; decode and execute them; and then write one or more results to an internal register, an internal cache, or the network memory 160. Specifically, the network processor 150 may include one or more internal caches for data, instructions, or addresses. This disclosure contemplates the network processor 150 including any suitable number of internal caches, where appropriate. As an example, and not by way of limitation, the network processor 150 may include one or more instruction caches, one or more data caches, and one or more translation lookaside buffers (TLBs). Instructions in the instruction caches may be copies of instructions 162 in network memory 160, and the instruction caches may speed up retrieval of those instructions by the network processor 150. Data in the data caches may be copies of data in the network memory 160 for instructions executing at the network processor 150 to operate on via a processing engine 152; the results of previous instructions executed at the network processor 150 for access by subsequent instructions executing at the network processor 150 or for writing to the network memory 160; or other suitable data. The data caches may speed up read or write operations by the network processor 150. The TLBs may speed up virtual-address translation for the network processor 150. In particular embodiments, the network processor 150 may include one or more internal registers for data, instructions, or addresses. This disclosure contemplates the network processor 150 including any suitable number of suitable internal registers, where appropriate. Where appropriate, the network processor 150 may include one or more arithmetic logic units (ALUs); be a multi-core processor; or include one or more additional network processors 150. Although this disclosure describes and illustrates a particular processor, this disclosure contemplates any suitable processor.

In one or more embodiments, the network memory 160 includes a main memory for storing the instructions 162 for the network processor 150 to execute or data for the network processor 150 to operate on. As an example, and not by way of limitation, the network component 102 may load the instructions 162 from another memory in the network component 102 (e.g., the internal memory 124 of the NPUs 122). The network processor 150 may then load the instructions 162 from the network memory 160 to an internal register or internal cache. To execute the instructions 162, the network processor 150 may retrieve the instructions 162 from the internal register or internal cache and decode them. During or after execution of the instructions 162, the network processor 150 may write one or more results (which may be intermediate or final results) to the internal register or internal cache. The network processor 150 may then write one or more of those results to the network memory 160. In some embodiments, the network processor 150 executes only the instructions 162 in one or more internal registers or internal caches or in the network memory 160 (as opposed to the internal memory 124, the external memory 170, or elsewhere) and operates only on data in one or more internal registers or internal caches or in the network memory 160 (as opposed to the internal memory 124, the external memory 170, or elsewhere). The interconnect 140 may be one or more memory buses (which may each include an address bus and a data bus) that may couple the network processor 150 to the network memory 160. In other embodiments, one or more memory management units (MMUs) reside between the network processor 150 and the network memory 160 and facilitate accesses to the network memory 160 requested by the network processor 150. In particular embodiments, the network memory 160 includes random access memory (RAM). This RAM may be volatile memory, where appropriate. Where appropriate, this RAM may be dynamic RAM (DRAM) or static RAM (SRAM).

Moreover, where appropriate, this RAM may be single-ported or multi-ported RAM. This disclosure contemplates any suitable RAM. The network memory 160 may include one or more additional memories, where appropriate. Although this disclosure describes and illustrates particular memories, this disclosure contemplates any suitable memory or combination of suitable memories.

In one or more embodiments, the network memory 160 includes commands or data associated with one or more specific applications. In FIG. 1, the network memory 160 includes threshold controls 164 that may be retrieved by the network processor 150 to regulate data packet transmissions in the communication paths 110 and 112. In some embodiments, the threshold controls 164 may be one or more buffering threshold levels indicating a triggering limit to ready to pause, pause, or restart data packet transmissions from a source (e.g., the network 104 or the one or more client device 106) to the internal memory 124 and the external memory 170. In other embodiments, the threshold controls 164 may be copies of commands provided by the NPUs via a priority flow control (PFC) 130. A non-limiting example of the threshold controls 164 is described in reference to FIG. 3. In one or more embodiments, the triggering limit to pause data packet transmissions, the service module 120 may provide the triggering limit to the internal memory interface 136, the communication interface 190, one or more devices on the network 104, or the one or more client devices 106.

In particular embodiments, the external memory 170 includes mass storage for data or instructions. As an example, and not by way of limitation, the external memory 170 may include a hard disk drive (HDD), a floppy disk drive, flash memory, an optical disc, a magneto-optical disc, magnetic tape, or a Universal Serial Bus (USB) drive or a combination of two or more of these. The external memory 170 may include removable or non-removable (or fixed) media, where appropriate. The external memory 170 may be internal or external to a computer system, where appropriate. In particular embodiments, the external memory 170 is non-volatile, solid-state memory. In particular embodiments, the external memory 170 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates the external memory 170 as a mass storage taking any suitable physical form. The external memory 170 may include one or more storage control units facilitating communication between the network processor 150 and the external memory 170, where appropriate. Where appropriate, the external memory 170 may include the external memory 170. Although this disclosure describes and illustrates particular storage, this disclosure contemplates any suitable storage.

In one or more embodiments, the I/O interface 180 includes hardware, software executed by software, or a combination of both, providing one or more interfaces for communication between the network component 102 and one or more I/O devices. The network component 102 may include one or more of these I/O devices, where appropriate. One or more of these I/O devices may enable communication between a person and the network component 102. As an example, and not by way of limitation, an I/O device may include a keyboard, keypad, microphone, monitor, mouse, printer, scanner, speaker, still camera, stylus, tablet, touch screen, trackball, video camera, another suitable I/O device, or a combination of two or more of these. An I/O device may include one or more sensors. This disclosure contemplates any suitable I/O devices and any suitable I/O interfaces 180 for them. Where appropriate, I/O interface 180 may include one or more device or software drivers enabling the network processor 150 to drive one or more of these I/O devices. The I/O interface 180 may include one or more I/O interfaces 180, where appropriate. Although this disclosure describes and illustrates a particular I/O interface 180, this disclosure contemplates any suitable I/O interface 180.

In one or more embodiments, the communication interface 190 includes hardware, software executed by hardware, or a combination of both providing one or more interfaces for communication (such as, for example, packet-based communication) between the network component 102, the one or more client devices 106, the network 104, or one or more additional networks. As an example, and not by way of limitation, the communication interface 190 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable corresponding communication interface 190. As an example, and not by way of limitation, the network component 102 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the network component 102 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. The network component 102 may include any suitable communication interface 190 for any of these networks, where appropriate. The communication interface 190 may include one or more communication interface 190, where appropriate. Although this disclosure describes and illustrates a particular communication interface, this disclosure contemplates any suitable communication interface.

In particular embodiments, the interconnect 140 includes hardware configured to couple components of the network component 102 to each other. As an example and not by way of limitation, the interconnect 140 may include an Accelerated Graphics Port (AGP) or a graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. The interconnect 140 may include one or more interconnect 140, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

In one or more embodiments, the service module 120 is hardware, software executed by hardware, or a combination of both, providing one or more service components to route and assign resources for data packet transmissions. The service module 120 may include the one or more NPUs 122, the one or more GPUs 134, an internal memory interface 136, and an external memory interface 138 interconnected via a transmission bus (not shown, but similar to the interconnect 140). The service module 120 may be a routing device configured to route resources in the network 104 to the one or more client devices 106. Each of the NPUs 122 may include the internal memory 124, an internal processor 126, multiple data processing cores 128, and one or more hardware accelerators 132 connected to one another via a bus connection (not shown, but similar to the interconnect 140). In some embodiments, the NPUs 122 and the GPUs 134 may be included on a same card or die. In this regard, the NPUs 122 and the GPUs 134 may be interconnected via a PCI, FIFOs, and shared memory registers. Each GPU of the GPUs 134 may include one or more deep packet inspection (DPI) modules (not shown) providing DPI functionality for the GPUs 134. The GPUs 134 may be a more robust processor, have different performance metrics, be more adept at processing certain types of information (e.g., tracking transactions, parsing high level protocols, computing complex policy enforcement rules, maintaining large data bases of policy options), or be preferred (for other optimization reasons) over the internal processor 126 or other processors in the network component 102 to which the service module 120 interfaces. Further, the GPUs 134 may be tasked with processing related to coordinating hand-offs of a single data flow between the GPUs 134 and the NPUs 122. In some examples, the GPUs 134 may be implemented using PowerPC, Pentium, Athlon, and other processing devices. Each of the GPUs 134 may be encoded with, interface, or otherwise execute logic, embodied in data path processing cores 128, to interface with one or more of the NPUs 122. In some embodiments, the data path processing cores 128 may be implemented with each of the GPUs 134. The data path processing cores 128 may be further encoded with logic permitting assistance in facilitating, routing, delegating, forwarding, and negotiating communications and data between the GPUs 134 and the NPUs 122. In some embodiments, the data path processing cores 128 may decode/encode data packets in multiple formats for transmitting between the GPUs 134 and the NPUs 122 across PCI, FIFOs, shared memory registers, and other interfaces in the network component 102. The data path processing cores 128 may record and maintain states concerning the status of data packet transmissions to/from the service module 120 (e.g., how many data packet transmissions are sent, where all data packets received at their destination, and the like).

In one or more embodiments, the network component 102 may utilize the NPUs 122 to offload handling of portions of some data flows from the GPUs 134. The NPUs 122 may implement a limited set of counting primitives and a number of trigger conditions that may be associated with each flow handled by the network component 102. For instance, if a trigger condition is met for a particular data flow, data packets for that flow can be dispatched to a GPU (e.g., out of the GPUs 134) via in-band communication paths with an appended message (or if no packets are currently flowing via an out-of-band communication path), a summary the counters and conditions of that flow as noted by the NPUs 122, as well as trigger conditions that caused the message to be generated. The data packets in the data flow may be processed by the GPUs 134, for example, for deep-packet processing in connection with policy controls, authentication procedures, or other features provided, at least in part, through the network component 102. As a non-limited example, the NPUs 122 may transfer control of a data flow to a GPU of the GPUs 134 to process portions of a particular data flow.

In other embodiments, the one or more hardware accelerators 132 may be specialized hardware accelerators configured to implement networking-specific processing tasks in custom logic and achieve better performance than typical software implementations. For example, the hardware accelerators 132 may be lookup engines (e.g., using specialized logic), cryptographic coprocessors, content inspection engines, and the like. The hardware accelerators 132 may be located in the same die or electronic board with the data path processing cores 128 in the NPUs 122.

In some embodiments, the internal memory interface 136 may be communicatively coupled to the internal memory 124. The internal memory interface 136 may be a wired connection that shares an internal bandwidth for data packet transmissions inside the NPUs 122. The internal memory 124 may be configured with an internal buffering capacity and an internal memory speed. The internal buffering capacity may indicate a buffering capacity (in bytes) that the internal memory 124 is capable of handling. For example, the internal buffering capacity may be 1,000 bytes. Further, the internal memory speed may indicate a processing speed (in bytes per second) at which the internal memory 124 is capable of handling or buffering data packets. For example, the internal memory speed may be 1,000 bytes per second. The internal memory 124 may include instructions and data memory for the data path processing cores 128 and the internal processor 126. In other embodiments, some portions of the memory are shared among the data path processing cores 128 and the internal processor 126. The internal memory 124 may include caches similar to those found the network processor 150. The internal memory 124 may be located and manufactured in a same die with one or more of the NPUs 122.

In some embodiments, the external memory interface 138 communicatively coupled to the external memory 170. The external memory interface 138 may be a wired or wireless connection that shares an external bandwidth for data packet transmissions outside the NPUs 122. The external memory 170 may be configured with an external buffering capacity and an external memory speed. The external buffering capacity may indicate a buffering capacity (in bytes) that the external memory 170 is capable of handling. For example, the external buffering capacity may be 700 bytes. Further, the external memory speed may indicate a processing speed (in bytes per second) at which the external memory 170 is capable of handling or buffering data packets. For example, the external memory speed may be 7000 bytes per second. The external memory 170 may be located and manufactured in a different die those of the NPUs 122.

In some embodiments, the external buffering capacity may be equal to, greater than, or less than the internal buffering capacity. In other embodiments, the external memory speed may be equal to, greater than, or less than the internal memory speed.

In one or more embodiments, the priority flow control 130 may be software executed by hardware and configured to provide enhancements to data transmissions by sensing pauses, pausing, and restarting data packet transmissions in the communication paths 110 and 112. The priority flow control 130 may create separate virtual links on a physical link and may allow any of the virtual links to be paused and restarted independently. In some embodiments, the priority flow control 130 enables the network component 102 to create a no-drop class of service for an individual virtual link. The priority flow control 130 provides per-priority enabling or disabling of flow controls for data packet transmissions. The priority flow control 130 may be configured to buffer a number of data packets in each of the memories associated with the NPUs 122.

In some embodiments, the internal processor 126 and the data path processing cores 128 may be configured to monitor the external buffering of data packets in the external memory 170. Further, the internal processor 126 and the data path processing cores 128 may be configured to start, pause, or restart data packet transmissions from the internal memory 124 to the external memory 170. In cases where the external memory speed is slower than the internal memory speed, the internal processor 126 and the data path processing cores 128 may be configured to determine a current buffering level of the external memory 170. At this stage, the internal processor 126 and the data path processing cores 128 may be configured to compare the current buffering level of the internal memory 124 to a first buffering threshold established via the threshold controls 164. As it is described in reference to FIGS. 2 and 3, the buffering level of the internal memory 124 is indicative of a buffering capacity difference between the internal buffering capacity and the external buffering capacity. In response to determining that the current buffering level of the internal memory 124 is greater than or equal to the first buffering threshold, the internal processor 126 and the data path processing cores 128 may be configured to pause the data packet transmissions to the internal memory 124 and the external memory 170.

In one or more embodiments, the internal processor 126 and the data path processing cores 128 may be configured to compare the current buffering level of the internal memory 124 to a second buffering threshold. The second buffering threshold may be indicative of a memory speed difference between the external memory speed and the internal memory speed. In response to determining that the second buffering threshold is greater than or equal to the current buffering level of the internal memory, the internal processor 126 and the data path processing cores 128 may be configured to restart the data packet transmissions from the internal memory 124 to the external memory 170. As shown in FIG. 3, the first buffering threshold may be a preconfigured watermark value associated with a buffering limit in the external memory. Further, the second buffering threshold may be a preconfigured counter value associated with a buffering limit in the internal memory. The internal processor 126 and the data path processing cores 128 may be configured to determine an amount of time to perform lossless data packet transmissions between the external memory 170 and the internal memory 124 based at least in part upon a first drain rate of the external memory 170 and a second drain rate of the internal memory 124. At this stage, the internal processor 126 and the data path processing cores 128 may be configured to pause the data packet transmissions to the internal memory 124 and the external memory 170 within the amount of time. The amount of time may be a dynamically updated amount of time or a preconfigured amount of time.

In one or more embodiments, the network 104 may be a combination of electronic devices forming a multi-node mesh. As an example and not by way of limitation, one or more portions of the network 104 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular technology-based network, a satellite communications technology-based network, another network 104, or a combination of two or more such networks 104.

In one or more embodiments, the one or more client devices 106 include end-user devices such as laptops, phones, tablets, and any other suitable device that are capable of receiving, creating, processing, storing, or communicating information, including data packet transmissions. The client devices 106 may comprise one or more network interfaces, at least one processor, and a memory that is interconnected by a system bus as well as a power supply. In some embodiments, the client devices 106 represents devices that are capable of receiving real-time data packet transmissions and may include general purpose computing devices (e.g., servers, workstations, desktop computers, and the like), mobile computing devices (e.g., laptops, tablets, mobile phones, and the like), wearable devices (e.g., watches, glasses, or other head-mounted displays (HMDs), ear devices, and the like), and so forth. The client devices 106 may also include Internet of Things (IoT) devices or equipment, such as agricultural equipment (e.g., livestock tracking and management systems, watering devices, unmanned aerial vehicles (UAVs), and the like); connected cars and other vehicles; smart home sensors and devices (e.g., alarm systems, security cameras, lighting, appliances, media players, Heating Ventilation, and Air Conditioning (HVAC) equipment, utility meters, windows, automatic doors, door bells, locks, etc.); office equipment (e.g., desktop phones, copiers, fax machines, and the like); healthcare devices (e.g., pacemakers, biometric sensors, medical equipment, and the like); industrial equipment (e.g., robots, factory machinery, construction equipment, industrial sensors, and the like); retail equipment (e.g., vending machines, point of sale (POS) devices, Radio Frequency Identification (RFID) tags, and the like); smart city devices (e.g., street lamps, parking meters, waste management sensors, and the like); transportation and logistical equipment (e.g., turnstiles, rental car trackers, navigational devices, inventory monitors, and the like); and so forth.

FIG. 2 shows an example operational flow 200 to perform lossless data packet transmissions in the buffering system 100 of FIG. 1, in accordance with one or more embodiments. In FIG. 2, the operational flow 200 is performed by different components in the network component 102. In particular, the operational flow 200 may be performed using the internal processor 126 and the data path processing cores 128 to support operations in which data packet transmissions are monitored and controlled. As a non-limiting example, the communication interface 190 is shown as the source of data packet transmissions into the network component 102 via the communication path 110 and the communication path 112. The communication interface 190 may also transfer data packet transmissions outside from the network component 102 via the communication path 110 and the communication path 112. In some embodiments, the communication interface includes an input 280 to the primary memory 205 and an output 290 from the secondary memory 207 to transmit and receive data packet transmissions, respectively. In some embodiments, the input 280 and the output 290 are representative of one or more connections and interfaces (e.g., the interconnect 140, the internal memory interface 136, or the external memory interface 138) associated with exchanging the data packet transmissions from the communication path 110 or the communication path 112 to the primary memory 205 and the secondary memory 207.

In the example of FIG. 2, the network component 102 may further include a primary memory 205 (e.g., the internal memory 124) inside the NPUs 122, and a secondary memory 207 (e.g., the external memory 170) outside the NPUs 122. In FIG. 2, the internal processor 126 is shown as a starting point of the operational flow 200. The internal processor 126 is connected to the data path processing cores 128 via one or more connection paths that are not shown. Further, the primary memory 205 is shown connected to the secondary memory 207 via the connection path 208. The internal processor 126 and the data path processing cores 128 may operate in connection with the communication interface to monitor and control data packet transmissions in the input 280 and the output 290. The operational flow 200 ends at the external memory 170 where data packet transmissions are transmitted via the output 290. In some embodiments, the connection paths 204 and 208 may be wired or wireless connections directly coupling one or more components. In other embodiments, the connection paths 204 and 208 may be wired or wireless connections coupling one or more components via additional forwarding or interconnecting components. For example, the primary memory 205 and the secondary memory 207 may be connected to one another directly or via an additional component (e.g., interconnect 140). In FIG. 2, while the connection paths 204 and 208 indicate a flow of information followed by the operational flow 200, additional connections may be included (such as those described in relation to FIG. 1). For example, while the connection path 204 is shown between the data path processing cores 128 and the primary memory 205, an additional connection may be present in which the primary memory 205 communicates directly with the internal processor 126 (e.g., via the interconnect 140 described in FIG. 1).

In the example of FIG. 2, the primary memory 205 may include an internal buffering capacity 250 and an internal memory speed 252 which are internal to the NPUs 122. In FIG. 2, the internal buffering capacity 250 and the internal memory speed 252 may be a few bytes in capacity, offer only a few microseconds of buffering, and have write/read bandwidth which may be a limit throughput in the NPUs 122. Further, the secondary memory 207 may include an external buffering capacity 274 and an external memory speed 276 which are external to the NPUs 122. In FIG. 2, the external buffering capacity 274 and the external memory speed 276 may be several bytes in capacity, offer a few milliseconds of buffering, and have write/read bandwidth which is much lower than the throughput in the NPUs 122. During data packet transmissions, the data transmissions may include queuing individual packets in the primary memory 205 via the input 280. Some of the packets in the primary memory 205 may be queued to the secondary memory 207 as the primary memory 205 approaches the internal buffering capacity 250. In turn, the secondary memory 207 is filled until the external buffering capacity 274 is filled up. As the external buffering capacity 274 fills up, a tail 242 of the primary memory 205 may grow over time in proportion to a head 272 of the secondary memory 207. The tail 242 may grow up to a predetermined threshold. In this regard, the packets are queued in the primary memory 205 and the secondary memory 207 during the data packet transmissions such that the two queues may be considered to form a single virtual queue from the tail 242 in the primary memory 205 to the head 272 in the secondary memory 207. The primary memory 205 and the secondary memory 207 may be virtually connected via the tail 242 of the primary memory 205 and a start 262 of the secondary memory 207, where individual packets are read from a queue instance in the primary memory 205 and written to a queue instance in the secondary memory 207. In the operational flow 200, the data packet transmission is maintained as long as a threshold limit is not met in the external buffering capacity 274. The threshold limit may be a buffering capacity value accounting for a difference between the internal memory speed 252 and the external memory sped 276 such that the threshold limit is met before the internal buffering capacity 250 is met.

In the NPUs 122, the internal processor 126 may execute one or more buffering threshold commands 210 to separately account for packet transition rate from the primary memory 205 to the secondary memory 207. The buffering threshold commands 210 may be part or a copy of the threshold controls 164 described in reference to the network processor 150. In one or more embodiments, the buffering threshold commands 210 may include a first counter that estimates a number of packets 230 within the internal buffering capacity 250. In some embodiments, the buffering threshold commands 210 may include a second counter that estimates a number of packets 260 within the external buffering capacity 274. The internal processor 126 may be configured to reference watermark thresholds associated with the primary memory 205. The watermark thresholds may be low watermarks, high watermarks, or a combination of both. Further, the watermark thresholds may be counters representing a buffering limit for the internal buffering capacity 250 or the external buffering capacity 274 to avoid overflow. The watermark thresholds may be implemented as XOFF/XON limits. The XOFF/XON limits may be configuration settings implemented in the internal processor 126 in accordance with the Institute of Electrical and Electronics Engineers (IEEE) standard 802.3x. In some embodiments, a high watermark threshold is an XOFF limit which provides an upper-level limit threshold, and a low watermark threshold is an XON limit which provides a lower-level limit. In other embodiments, the XOFF limit generates a PAUSE frame in a data packet transmission when a buffer limit is met (e.g., the internal buffering capacity 250 reaches or exceeds the XOFF limit). The PAUSE frame may be generated by the internal processor 126 as a request to stop transmitting traffic for a period of time at the input 280 to the primary memory 205 and the secondary memory 207. The period of time allotted may enable egress and ingress queues of the primary memory 205 to be cleared. In a case when the ingress queue falls below a lower watermark threshold (XON limit), the PAUSE frame may be generated with a value of zero (0). The PAUSE frame requests that the input 280 resume sending traffic normally.

In some embodiments, the internal processor 126 may execute one or more reaction time commands 212 to provide an amount of time in which the PAUSE frame may be requested. The reaction time commands 212 may enable identification procedures in which egress and ingress queues are estimated in relation to the internal buffering capacity 250 and the external buffering capacity 274.

In one or more embodiments, the buffering threshold commands 210 and the reaction time commands 212 may be predetermined values preconfigured in the internal processor 126. In some embodiments, the buffering threshold commands 210 and the reaction time commands 212 may be dynamically updated values configured in the internal processor 126 over time. The buffering threshold commands 210 and the reaction time commands 212 may be predetermined values preconfigured in the internal processor 126. The internal processor 126 may coordinate implementation of the buffering threshold commands 210 and the reaction time commands 212 with the data path processing cores 128, the hardware accelerators 132, or the priority flow control 130.

In the example of FIG. 2, the data path processing cores 128 includes a buffering capacity monitoring element 222, a memory speed monitoring element 224, and a buffering level monitoring element 226. The data path processing cores 128 may be communicatively coupled to the internal processor 126 via the connection path 204. The buffering capacity monitoring element 222 may be at least one portion of a processing core configured to monitor and control the internal buffering capacity 250 and the external buffering capacity 274 by limiting the data packet transmissions at the input 280. In this regard, the buffering capacity monitoring element 222 may be configured to determine or confirm a current buffering capacity of the primary memory 205 or the secondary memory 207. The current buffering capacity may be the difference of packets in the egress and ingress queues. In some embodiments, the buffering capacity monitoring element 222 may compare a current buffering capacity in the primary memory 205 or the secondary memory 207 to a corresponding baseline capacity or a corresponding expected capacity. The memory speed monitoring element 224 may be at least one portion of a processing core configured to monitor and track the internal memory speed 252 and the external memory speed 276. In this regard, the memory speed monitoring element 224 may be configured to determine or confirm a current memory speed of the primary memory 205 and the secondary memory 207. The current memory speed may be the difference in the processing of packages between the egress queue and the ingress queue. In some embodiments, the memory speed monitoring element 224 may compare a current memory speed in the primary memory 205 or the secondary memory 207 to a corresponding baseline speed or a corresponding expected speed. The buffering level monitoring element 226 may be at least one portion of a processing core configured to monitor and track current buffering levels of the primary memory 205 and the secondary memory 207. The current buffering levels may be a percentage of the internal buffering capacity 250 or the external buffering capacity 274 that is occupied at any given point in time.

In one or more embodiments, the primary memory 205 includes the internal buffering capacity 250 and the internal memory speed 252. The primary memory 205 buffers some data packets and forwards other data packets to the secondary memory 207 during transmissions via the connection path 208. A buffer in the primary memory 205 fills in as the packets 230 are queued. In FIG. 2, the primary memory 205 is shown with twenty (20) blocks that evenly distribute space in the buffer. Each block shown may be multiple bytes of buffering space in the primary memory 205. For example, each block may be 2,000 bytes if the entirety of the buffer includes 40,000 bytes of capacity. The blocks are labeled with marks 234-240 that sequentially indicate four (4) blocks in the buffer from a start 232 to the end of the buffer and including the tail 242. In FIG. 2, the tail 242 indicates the location of the buffer of the primary memory 205 in which one (1) block of packets 230 are buffered and the location of the buffer of the primary memory 205 in which a predetermined number of blocks of packets 230 are enqueued. Further, the mark 240 indicates a location in which four (4) blocks of packets 230 are buffered; the mark 238 indicates a location in which eight (8) blocks of packets 230 are buffered; the mark 236 indicates a location in which twelve (12) blocks of packets 230 are buffered; the mark 234 indicates a location in which sixteen (16) blocks of packets 230 are buffered; and the start 232 indicates a location in which twenty (20) blocks of packets 230 are buffered. In FIG. 2, the tail 242 is one (1) block of packets 230 at the start of the buffer.

In some embodiments, the example of FIG. 2 shows three ranges including a drain buffer 244, a reaction time 246, and a threshold buffer 248. The drain buffer 244 is a range in which the packets 230 are added to the buffer from the input 280. In FIG. 2, the drain buffer 244 spawns a range from the start 232 to the mark 234. The reaction time 246 is a range in which the packets 230 buffered in the primary memory 205 are within a transmission time to the secondary memory 207 without filling up the primary memory 205 to meet the internal buffering capacity 250. In FIG. 2, the reaction time 246 spawns a range from the mark 234 to the mark 240. The threshold buffer 248 is a range in which the packets 230 are readied for unloading onto the secondary memory 207. In FIG. 2, the threshold buffer 248 spawns a range from the mark 240 to the end of the buffer.

As a non-limiting example, the internal buffering capacity 250 may be equal to 10,000 gigabytes (GBs) and the internal memory speed 252 may be equal to 200 GBs per second (Gbps). Each block shown in FIG. 2 may be 500 GBs if the entirety of the buffer includes 10,000 GBs of capacity. In FIG. 2, the tail 242 indicates the location of the buffer of the primary memory 205 in which 500 GBs of the packets 230 may be buffered. Further, the mark 240 indicates a location in which 2,000 GBs of packets 230 may be buffered; the mark 238 indicates a location in which 4,000 GBs of packets 230 may be buffered; the mark 236 indicates a location in which 6,000 GBs of packets 230 may be buffered; the mark 234 indicates a location in which 8,000 GBs of packets 230 may be buffered; and the start 232 indicates a location in which 10,000 GBs of packets 230 may be buffered.

In one or more embodiments, the secondary memory 207 includes the external buffering capacity 274 and the external memory speed 276. The secondary memory 207 receives data packets via the connection path 208 from the primary memory 205 during transmissions. The secondary memory 207 may transmit data packets via the output 290 to the communication interface 190 and out of the network component 102 during transmissions. A buffer in the secondary memory 207 fills in as the packets 260 are queued. In FIG. 2, the secondary memory 207 is shown with twenty (20) blocks that evenly distribute space in the buffer. Each block shown may be multiple bytes of buffering space in the secondary memory 207. For example, each block may be 2,000 bytes if the entirety of the buffer includes 40,000 bytes of capacity. The blocks are labeled with marks 264-270 that sequentially indicate four (4) blocks in the buffer from the start 262. In FIG. 2, the start 262 indicates the location of the buffer of the secondary memory 207 in which zero (0) block of packets 260 are buffered; and the head 272 indicates the location of a final block of packets 260 in the buffer. Further, the mark 264 indicates a location in which four (4) blocks of packets 260 are buffered; the mark 266 indicates a location in which eight (8) blocks of packets 260 are buffered; the mark 268 indicates a location in which twelve (12) blocks of packets 260 are buffered; and the mark 270 indicates a location in which sixteen (16) blocks of packets 260 are buffered. In FIG. 2, the head 272 is one (1) block of packets 260 at end of the buffer.

As a non-limiting example, the external buffering capacity 274 may be equal to 20,000 GBs and the external memory speed 276 may be equal to 4,000 Gbps. Each block shown in FIG. 2 may be 1,000 GBs if the entirety of the buffer includes 20,000 GBs of capacity. In FIG. 2, the head 272 indicates the location of the buffer of the secondary memory 207 in which last 1,000 GBs of the packets 260 may be buffered. Further, the start 262 indicates a location in which the buffering may start; the mark 264 indicates a location in which 4,000 GBs of packets 260 may be buffered; the mark 266 indicates a location in which 8,000 GBs of packets 260 may be buffered; the mark 268 indicates a location in which 12,000 GBs of packets 260 may be buffered; and the mark 270 indicates a location in which 16,000 GBs of packets 260 may be buffered.

Continuing with the examples of FIG. 2, a bandwidth of the secondary memory 207 may be 4,000 Gbps, a bandwidth of the network 104 may be 800 Gbps, a length of the communication path 110 or the communication path 112 may be 1,000 meters (m), and a data packet size is 1,500 bytes. In this regard, the threshold buffer 248 of 4,000 GBs; the drain buffer 244 may be equal to about 4,000 GBs; and the reaction time 246 may be equal to a time it takes to buffer 12,000 GBs.

In a non-limiting example, relying on the operational flow 200 of FIG. 2, the internal processor 126 and the data path processing cores 128 establish the buffering thresholds to trigger a pause point and a restart point of the data packet transmissions from the input 280. In the primary memory 205, data packets are moved to the secondary memory 207 to absorb larger bursts in cases where the internal buffering capacity is close to an upper limit. During the data packet transmissions, there may be one queue in the primary memory 205 and another queue in the secondary memory 207. The data packets 230 are enqueued to a queue in the primary memory 205 from the input 280, copied to a queue in the secondary memory 207 from the primary memory 205, and dequeued from the queue in the secondary memory 207 via the output 290. In this regard, the two queues are viewed as a single virtual queue with the tail 242 (where data packets are enqueued) in primary memory 205 and the head 272 (where data packets are dequeued away) in the secondary memory 207. The data packets are read from the queue in the primary memory 205 and written to the queue in the secondary memory 207. If the total rate of congested traffic being enqueued to the primary memory 205 is lower than the external memory speed 276 (e.g., the external memory write rate), the primary memory 205 may remain shallow while the data packets 260 are constantly flushing to the secondary memory 207 at a rate higher than an incoming rate. If the total rate of congested traffic being enqueued to the primary memory 205 is higher than the external memory speed 276, the primary memory 205 may continue growing as long as the data packets 230 are received at a rate higher than a rate to be written to secondary memory 207.

In this example, the internal processor 126, the data path processing cores 128, or the priority flow control 130 may be configured with a first counter that compares a first value with a first buffering threshold (e.g., the XOFF limit) and a second counter that compares a second value with a second buffering threshold (e.g., the XON limit). During a data packet transmission, data packets originating from a source port which are stuck in any destination queue waiting to be scheduled out may be collectively accounted on a per source per traffic-class basis by source-buffer counters. In a case where the first counter crosses the first buffering threshold, the data path processing cores 128 may send an XOFF command for that source port on the corresponding traffic-class to pause transmissions via the input 280. Further, in a case where the second counter crosses the second buffering threshold, the data path processing cores 128 may send an XON command for that source port on the same traffic-class to resume the transmissions via the input 280. The XOFF commands and the XON commands may throttle the communication interface 190 to match a rate of change in a queue bandwidth in the primary memory 205 (e.g., the drain rate of the primary memory 205).

In one or more embodiments, the internal processor 126, the data path processing cores 128, or the priority flow control 130 may cause the primary memory 205 to perform lossless data packet transmissions using a high watermark/XOFF limit value to ride over short burst and without prematurely send XOFF commands. The XOFF limits are implemented in the primary memory 205. In this regard, when a total congested traffic exceeds the drain rate of the primary memory 205 (e.g., write/read bandwidth), the primary memory 205 is prevented from growing and reaching a total size of the internal buffering capacity 250.

FIG. 3 shows an example state machine flow 300 for the buffering system 100 of FIG. 1, in accordance with one or more embodiments. The state machine flow 300 may be followed by the internal processor 126 and the data path processing cores 128 to perform the operational flow 200 of FIG. 2 in the primary memory 205 and the secondary memory 207. In FIG. 3, the internal processor 126 and the data path processing cores 128 follow at least three different machine states 310-330 in a sequence. Each state may be triggered following responses to instances in which buffering levels in the memories match a corresponding buffering threshold.

As described above, the internal processor 126 and the data path processing cores 128 may be configured to monitor the internal buffering of data packets in the primary memory 205. Further, the internal processor 126 and the data path processing cores 128 may be configured to start data packet transmissions from the primary memory 205 to the secondary memory 207. In cases where the external memory speed 276 is slower than the internal memory speed 252, the internal processor 126 and the data path processing cores 128 may be configured to monitor and control data packed processing throughput at the input 280. In this regard, the data packet transmissions may be paused if the tail 242 of the primary memory grows pass the threshold buffer 248. In some embodiments, the data packet transmissions may be restarted at the input 280 if the tail 242 of the primary memory falls below the threshold buffer 248.

In one or more embodiments, the internal processor 126 and the data path processing cores 128 may determine a current buffering level of the primary memory 205. At this stage, the internal processor 126 and the data path processing cores 128 may be configured to compare the buffering level of the primary memory 205 to a first buffering threshold established via the threshold controls 164. Herein, the buffering level of the primary memory 205 is indicative of a buffering capacity difference between the external buffering capacity 274 and the internal buffering capacity 250 (e.g., the tail 242 grows bigger in proportion to the head 272). In response to determining that the current buffering level of the primary memory 205 is greater than or equal to the first buffering threshold, the internal processor 126 and the data path processing cores 128 may be configured to pause the data packet transmissions from the communication interface 190 to the primary memory 205 and the secondary memory 205.

In one or more embodiments, the internal processor 126 and the data path processing cores 128 may be configured to compare the current buffering level of the primary memory 205 to a second buffering threshold. The second buffering threshold is indicative of a memory speed difference between the external memory speed 276 and the internal memory speed 252 (e.g., the second buffering threshold is met when the external memory speed 276 causes the secondary memory 207 to offload the packets 230 at the tail 242 of the primary memory 205 such that the second buffering threshold is met). In response to determining that the second buffering threshold is greater than or equal to the current buffering level of the primary memory 205, the internal processor 126 and the data path processing cores 128 may be configured to restart the data packet transmissions from the communication interface 190 to the primary memory 205 to the secondary memory 207. In the example of FIG. 3, the first buffering threshold may be a preconfigured watermark value associated with a buffering limit in the primary memory 205. Further, the second buffering threshold may be a preconfigured counter value associated with a buffering limit in the primary memory 205. The internal processor 126 and the data path processing cores 128 may be configured to determine an amount of time to perform lossless data packet transmissions between the primary memory 205 and the secondary memory 207 based at least in part upon a first drain rate of the primary memory 205 and a second drain rate of the secondary memory 207. At this stage, the internal processor 126 and the data path processing cores 128 may be configured to pause the data packet transmissions from the input 280 to the primary memory 205 and the secondary memory 207 within the amount of time.

At state 310, the internal processor 126, the data path processing cores 128, or the priority flow control 130 may be configured to perform data packet transmissions from a first memory to a second memory. In this state, a first counter may be set up as a high watermark (XOFF command for an XOFF limit) at a start value that is triggered when a buffer threshold is met. In the example of FIG. 3, the first counter is represented by the label WATERMARK at a start value labeled START VALUE and the buffer threshold is represented by the label BUFFER THRESHOLD. In the state machine flow 300, the state 310 is maintained as long as a value of the WATERMARK remains equal to or below a value of the BUFFER THRESHOLD. In this example, the first memory may be the primary memory 205 and the second memory may be the secondary memory 207.

By monitoring growth of the value of the WATERMARK from a START VALUE, a pause/XOFF command may be sent to communication interface 190 to control the input 280 when the value of the WATERMARK crosses the BUFFER THRESHOLD. In some embodiments, the data packet transmissions are completely lossless even when a write rate is not exceeded at the primary memory 205. In particular lossless data packet transmissions may be performed if the value of the BUFFER THRESHOLD is chosen to address a headroom requirement for the primary memory 205. The headroom requirement may be calculated such that subtracting the BUFFER THRESHOLD from the internal buffering capacity 250 remains higher than the headroom requirement.

Referring back to the operational flow 200, the state 310 may be represented as the primary memory 205 copying data packets to the secondary memory 207 until the threshold buffer 248 is triggered.

At state 320, the internal processor 126, the data path processing cores 128, or the priority flow control 130 may be configured to ready pause of data packet transmissions to the first memory (e.g., the primary memory 205 of FIG. 2) and the second memory (e.g., the secondary memory 207 of FIG. 2) via the input 280. In the transition to this state, a second counter may be set to a starting value. At this state, the second counter may be increased as long as the value of the WATERMARK remains higher than the value of the BUFFER THRESHOLD. In the example of FIG. 3, the second counter is represented by the label COUNTER. In the state machine flow 300, the state 320 is maintained as long as a value of the COUNTER continues to increase. Further, the current buffer level in the first memory may be monitored during this state to confirm that this memory is filling up at a rate that may cause packet losses. To this end, the current buffer level of the first memory is monitored and compared to the BUFFER THRESHOLD. The increasing value of the COUNTER is compared to a triggering value. The triggering value is configured via the reaction time commands 212 described in reference to FIG. 2. In the example of FIG. 3, the current buffer level is represented by the label BUFFER LEVEL and the triggering value is represented by the label TRIGGER VALUE.

In some embodiments, the state 320 transitions to the state 310 in a case where the BUFFER LEVEL is determined to be below the BUFFER THRESHOLD. In other embodiments, the state 320 transitions to the state 330 in a case where the COUNTER is above the TRIGGER VALUE.

Referring back to the operational flow 200, the state 320 may be represented as the primary memory 205 being monitored to determine that the internal buffering capacity 250 is below a triggering threshold. In this triggering threshold, the internal buffering capacity 250 is assumed to be within the reaction time 246 of the primary memory 205. In particular, the trigger is associated with a buffering level of the primary memory 205 and the reaction time 246 is a representation of an amount of time proportional to a time left in the primary memory 205 to perform lossless data packet transmissions to the secondary memory 207. As described above, the reaction time 246 is a time between crossing a global pause threshold labeled PAUSE THRESHOLD and any single congested queue instance in the primary memory 205 growing to a size where headroom from the primary memory 205 may not be absorbed by the secondary memory 207 queue in the external buffering capacity 274.

At state 330, the internal processor 126, the data path processing cores 128, or the priority flow control 130 may be configured to pause data packet transmissions from through the input 280 into the primary memory 205 and the secondary memory 207 via a pause/XOFF command. In this state, a second threshold is considered before data packet transmission is restored through the input 280. In this regard, a buffering level of the secondary memory 207 is identified and compared to the second threshold. In some embodiments, the second threshold is the START VALUE and the buffering level is measured using the WATERMARK. In the state machine flow 300, the state 330 remains active as long as the WATERMARK remains above the START VALUE. The state 330 transitions back to the state 310 only when the WATERMARK reaches a value higher than the START VALUE. At this stage, the PAUSE THRESHOLD is set equal to an original triggering value labeled ORIGINAL TRIGGERING VALUE.

After setting the PAUSE THRESHOLD to the ORIGINAL TRIGGERING VALUE, the headroom requirement is absorbed in the primary memory 205 before exceeding a maximum queue size in the primary memory 205 and before exceeding the internal buffering capacity 250. At this stage, the primary memory 205 queue may be moved to the secondary memory 207 with a reducing size (no more incoming data) eventually becoming a START VALUE which will be reflected by the value of the WATERMARK reaching the START VALUE. This operation may be the trigger to restore the ORIGINAL TRIGGERING VALUE of the PAUSE THRESHOLD, which may cause the pause/XON command to resume data traffic flow via the input 280.

Referring back to the operational flow 200, the state 330 may be represented as the primary memory 205 being monitored to determine that the internal buffering capacity 250 is below a triggering threshold.

FIG. 4 shows an example flowcharts of a process 400 to perform lossless data packet transmissions, in accordance with one or more embodiments. Modifications, additions, or omissions may be made to the process 400. The process 400 may include more, fewer, or other operations than those shown below. For example, operations may be performed in parallel or in any suitable order. While at times discussed as the network component 102, the one or more NPUs 122, or components of any of thereof performing operations described in the process 400. Any suitable system or components of the buffering system 100 may perform one or more operations of the process 400. For example, one or more operations of process 400 may be implemented, at least in part, in the form of software instructions 162 of FIG. 1, stored on non-transitory, tangible, machine-readable media (e.g., network memory 160 of FIG. 1) that when run by one or more processors (e.g., network processor 150 of FIG. 1) may cause the one or more processors to perform operations described in operations 402-418.

The process 400 starts at operation 402, where the internal processor 126 or the data path processing cores 128 performs data packet transmissions from one or more sources via the communication interface 190 and the input 280 to the primary memory 205 and the secondary memory 207. The primary memory 205 may include a first buffering capacity and a first memory speed. For example, the first memory may be the internal memory 124 described in reference to FIGS. 1-3. In this example, the first buffering capacity may be the internal buffering capacity 250 and the first memory speed may be the internal memory speed 252. The secondary memory 207 includes a second buffering capacity and a second processing speed. For example, the second memory may be the external memory 170 described in reference to FIGS. 1-3. In this example, the second buffering capacity may be the external buffering capacity 274 and the second memory speed may be the external memory speed 276. At operation 404, the internal processor 126 or the data path processing cores 128 monitors a first current buffering level of the primary memory 205. The first current buffering level may be a percentage of occupancy of the buffer associated with the internal memory 124 as shown in the operational flow 200 in FIG. 2.

The process 400 continues at operation 410, where the internal processor 126 or the data path processing cores 128 determines whether the first current buffering level is equal to or greater than a first buffering threshold. The first buffering threshold may be threshold buffer 248 of FIG. 2 or the BUFFER THRESHOLD described in reference to the state machine flow 300 in FIG. 3. If the first current buffering level is less than the first buffering threshold (e.g., NO), the process 400 returns to operation 402 where the communication interface 190 may continue data packet transmissions to the primary memory 205 and the secondary memory 207 via the input 280. If the first current buffering level is equal to or greater than a first buffering threshold (e.g., YES), the process 400 proceeds to operation 412. At operation 412, the internal processor 126 or the data path processing cores 128 pauses the data packet transmissions from the source to the primary memory and the secondary memory. At operation 414, the internal processor 126 or the data path processing cores 128 monitors a second current buffering level of the primary memory 205. The second current buffering level may be a percentage of occupancy of the buffer associated with the internal memory 124 as shown in the operational flow 200 in FIG. 2. At operation 416, the internal processor 126 or the data path processing cores 128 maintain the data transmission paused as indicated by state 330 in FIG. 3.

The process 400 continues at operation 420, where the internal processor 126 or the data path processing cores 128 determines whether the second buffering threshold is greater than the second current buffering level. The second buffering threshold may be waiting for the WATERMARK to reach the START VALUE described in reference to the state machine flow 300 in FIG. 3. If the second buffering threshold is equal to or less than the second current buffering level (e.g., NO), the process 400 returns to operation 414 where the data packet transmission remains paused. If the second buffering threshold is greater than the second current buffering level (e.g., YES), the process 400 proceeds to operation 402. Herein, the internal processor 126 or the data path processing cores 128 determines whether there are additional data packets for transmission. In particular, the internal processor 126 or the data path processing cores 128 restarts the data packet transmission to complete the transfer of the additional data packets if there are additional data packets for transmission. in one or more embodiments, the value of the first buffering threshold and the second buffering threshold may be equal or different to one another. In some embodiments, the first current buffering level and the second current buffering level may be a current buffering level of the primary memory (e.g., comparing the threshold buffer 248 against the tail 242).

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein.

Modifications, additions, or omissions may be made to the elements shown in the figures above. The components of a device may be integrated or separated. Moreover, the functionality of a device may be performed by more, fewer, or other components. The components within a device may be communicatively coupled in any suitable manner. Functionality described herein may be performed by one device or distributed across multiple devices. In general, systems and/or components described in this disclosure as performing certain functionality may comprise non-transitory computer readable memory storing instructions and processing circuitry operable to execute the instructions to cause the system/component to perform the described functionality.

While several embodiments have been provided in the present disclosure, it should be understood that the disclosed systems and methods might be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry configured to execute program code stored in memory. The term unit may have conventional meaning in the field of electronics, electrical devices and/or electronic devices and may include, for example, electrical and/or electronic circuitry, devices, modules, processors, receivers, transmitters, memories, logic solid state and/or discrete devices, computer programs or instructions for carrying out respective tasks, procedures, computations, outputs, and/or displaying functions, and so on, as such as those that are described herein.

The invention claimed is:

1. A system, comprising:
   a primary memory comprising a first buffering capacity and a first memory speed;
   a secondary memory communicatively coupled to the primary memory and comprising a second buffering capacity and a second memory speed, the second memory speed being slower than the first memory speed; and
   a processor communicatively coupled to the primary memory and the secondary memory, and configured to:
      control data packet transmissions received via an input to the primary memory and the secondary memory;
      monitor a current buffering level of the primary memory;
      compare the current buffering level to a first buffering threshold, the first buffering threshold being indicative of a buffering capacity difference between the first buffering capacity and the second buffering capacity; and
      in response to determining that the current buffering level is equal to or greater than the first buffering threshold, pause the data packet transmissions via the input to the primary memory and the secondary memory.

2. The system of claim 1, wherein the processor is further configured to:
   compare the current buffering level to a second buffering threshold, the second buffering threshold being indicative of a memory speed difference between the first memory speed and the second memory speed; and
   in response to determining that the second buffering threshold is greater than or equal to the current buffering level, restart the data packet transmissions via the input to the primary memory and the secondary memory.

3. The system of claim 1, wherein:
   the first buffering threshold is a preconfigured watermark value associated with a buffering limit in the secondary memory.

4. The system of claim 2, wherein:
   the second buffering threshold is a preconfigured counter value associated with a buffering limit in the primary memory.

5. The system of claim 1, wherein:
the primary memory is an internal memory communicatively coupled to an internal interface connection to an apparatus in the system; and
the secondary memory is an external memory communicatively coupled to an external interface connection to the apparatus in the system.

6. The system of claim 1, wherein the processor is further configured to:
in conjunction with performing the data packet transmissions via the input to the primary memory and the secondary memory, determine an amount of time to perform lossless data packet transmissions between the primary memory and the secondary memory based at least in part upon a first drain rate of the primary memory and a second drain rate of the secondary memory; and
pause the data packet transmissions via the input to the primary memory and the secondary memory within the amount of time.

7. The system of claim 6, wherein:
the amount of time is a dynamically updated amount of time or a preconfigured amount of time.

8. A method, comprising:
controlling, by a processor, data packet transmissions received via an input to a primary memory and a secondary memory, wherein:
the primary memory and the secondary memory are communicatively coupled to one another;
the primary memory comprises a first buffering capacity and a first memory speed;
the secondary memory comprises a second buffering capacity and a second memory speed; and
the second memory speed is slower than the first memory speed;
monitoring, by the processor, a current buffering level of the primary memory;
comparing, by the processor, the current buffering level to a first buffering threshold, the first buffering threshold being indicative of a buffering capacity difference between the first buffering capacity and the second buffering capacity; and
in response to determining that the current buffering level is equal to or greater than the first buffering threshold, pausing the data packet transmissions via the input to primary memory and the secondary memory.

9. The method of claim 8, further comprising:
comparing, by the processor, the current buffering level to a second buffering threshold, the second buffering threshold being indicative of a memory speed difference between the first memory speed and the second memory speed; and
in response to determining that the second buffering threshold is greater than or equal to the current buffering level, restarting the data packet transmissions via the input to the primary memory and the secondary memory.

10. The method of claim 8, wherein:
the first buffering threshold is a preconfigured watermark value associated with a buffering limit in the secondary memory.

11. The method of claim 9, wherein:
the second buffering threshold is a preconfigured counter value associated with a buffering limit in the primary memory.

12. The method of claim 8, wherein:
the primary memory is an internal memory communicatively coupled to an internal interface connection; and
the secondary memory is an external memory communicatively coupled to an external interface connection.

13. The method of claim 8, further comprising:
in conjunction with performing the data packet transmissions via the input to the primary memory and the secondary memory, determining an amount of time to perform lossless data packet transmissions between the primary memory and the secondary memory based at least in part upon a first drain rate of the primary memory and a second drain rate of the secondary memory; and
pausing the data packet transmissions via the input to the primary memory and the secondary memory within the amount of time.

14. The method of claim 13, wherein:
the amount of time is a dynamically updated amount of time or a preconfigured amount of time.

15. A non-transitory computer readable medium storing instructions that when executed by a processor cause the processor to:
control data packet transmissions received via an input to a primary memory and a secondary memory, wherein:
the primary memory and the secondary memory are communicatively coupled to one another;
the primary memory comprises a first buffering capacity and a first memory speed;
the secondary memory comprises a second buffering capacity and a second memory speed; and
the second memory speed is slower than the first memory speed;
monitor a current buffering level of the primary memory;
compare the current buffering level to a first buffering threshold, the first buffering threshold being indicative of a buffering capacity difference between the first buffering capacity and the second buffering capacity; and
in response to determining that the current buffering level equal to or greater than the first buffering threshold, pause the data packet transmissions via the input to primary memory and the secondary memory.

16. The non-transitory computer readable medium of claim 15, wherein the instructions further cause the processor to:
compare the current buffering level to a second buffering threshold, the second buffering threshold being indicative of a memory speed difference between the first memory speed and the second memory speed; and
in response to determining that the second buffering threshold is greater than or equal to the current buffering level, restart the data packet transmissions via the input to the primary memory and the second memory.

17. The non-transitory computer readable medium of claim 15, wherein:
the first buffering threshold is a preconfigured watermark value associated with a buffering limit in the secondary memory.

18. The non-transitory computer readable medium of claim 16, wherein:
the second buffering threshold is a preconfigured counter value associated with a buffering limit in the primary memory.

19. The non-transitory computer readable medium of claim 15, wherein:
  the primary memory is an internal memory communicatively coupled to an internal interface connection; and
  the secondary memory is an external memory communicatively coupled to an external interface connection.

20. The non-transitory computer readable medium of claim 15, wherein the instructions further cause the processor to:
  in conjunction performing the data packet transmissions via the input to the primary memory and the secondary memory, determine an amount of time to perform lossless data packet transmissions between the primary memory and the secondary memory based at least in part upon a first drain rate of the primary memory and a second drain rate of the secondary memory; and
  pausing the data packet transmissions via the input to the primary memory and the secondary memory within the amount of time.

* * * * *